No. 888,250. PATENTED MAY 19, 1908.
F. O. MICHELSON.
CAKE PAN.
APPLICATION FILED AUG. 7, 1907.

Witnesses

Inventor
Fredrica O. Michelson
By Victor J. Evans
Attorney

UNITED STATES PATENT OFFICE.

FREDRICA O. MICHELSON, OF THORSBY, ALABAMA.

CAKE-PAN.

No. 888,250.  Specification of Letters Patent.  Patented May 19, 1908.

Application filed August 7, 1907. Serial No. 387,521.

*To all whom it may concern:*

Be it known that I, FREDRICA O. MICHELSON, a citizen of the United States, residing at Thorsby, in the county of Chilton and State of Alabama, have invented new and useful Improvements in Cake-Pans, of which the following is a specification.

This invention relates to a cake pan, and more particularly to a pan of that type provided with means for facilitating the removal of the cake.

The invention has for one of its objects to improve and simplify the construction and operation of devices of this character so as to be comparatively easy and inexpensive to manufacture, thoroughly reliable and efficient in use, and composed of few parts.

A further object of the invention is the provision of a cake pan having a cutter arranged to rotate over the bottom and rim of the pan for cutting the cake therefrom, the said knife having a central disk portion that serves as a protector for preventing the cake from burning.

A further object of the invention is to provide a pan of the character referred to which is provided with a stationary knife disposed over the disk portion of the cutter for loosening the cake from the disk, there being a knife on the disk for loosening the cake from the central tube of the cake pan when such tube is employed.

With these objects in view and others, as will appear as the description proceeds, the invention comprises the various novel features of construction and arrangement of parts which will be more fully described hereinafter and set forth with particularity in the claims appended hereto.

Figure 1:
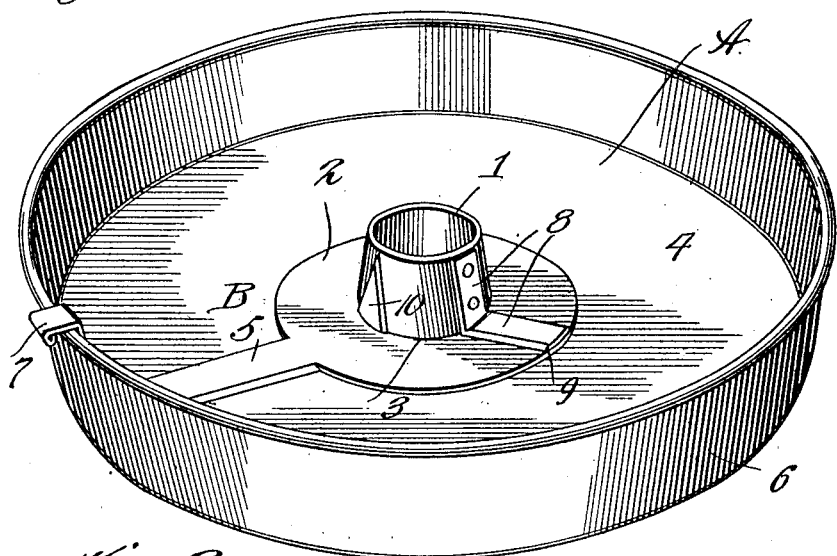
Figure 2:
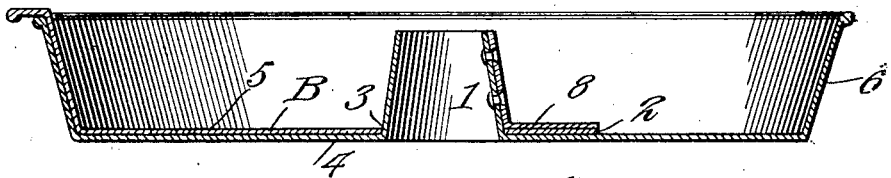
Figure 3:
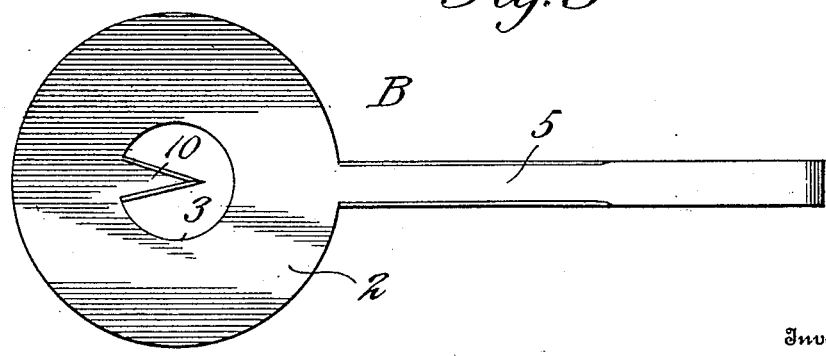

In the accompanying drawing, which illustrates one of the embodiments of the invention, Figure 1 is a perspective view of the cake pan. Fig. 2 is a central vertical section thereof. Fig. 3 is a plan view of the cutter showing the blank.

Similar reference characters are employed to designate corresponding parts throughout the several views.

Referring to the drawing, A designates a cake pan of ordinary construction which is of that type provided with a central heat conducting tube 1 at the center which assists in the even baking of the cake. The cutter or scraper designated generally by B, consists of a central disk portion 2 that is provided with an opening 3 to fit over the tube 1. The disk rests on the bottom 4 of the pan and rotates about the tube 1 as a center. Extending radially from the disk is a double-edged knife 5, the outer end of the knife being bent upwardly in contact with the flange or rim 6 of the pan and outwardly over the said rim to form a grip 7. The disk 2 serves as a protector for preventing the cake from burning at the bottom, since a double thickness of metal is thus provided at the center of the pan. Attached to the tube 1 is a stationary L-shaped cutter 8 that has the upright arm riveted to the tube and the lower arm beveled at both edges as indicated at 9 and bearing on the top surface of the disk 2, so as to scrape off the material that might otherwise stick on the latter. The device B is preferably a sheet metal punching shown in Fig. 3 and at the opening 3 of the disk 2 is a V-shaped knife 10 that is bent upwardly as shown in Fig. 1 to bear against the outside of the tube 1, and thereby cut the cake from the latter when the device B is rotated.

In practice, the device B is assembled in the manner shown in Fig. 1, and the cake batter applied to the pan and the cake baked in the usual manner. When it is desired to remove the baked cake, the grip 7 is taken in one hand and turned completely around while the pan is held stationary in the other hand. By this means, the cake will be loosened from the bottom and side of the pan by the blades 5, 8 and 10. The cake can then be removed perfectly whole and in a firm condition.

From the foregoing description, taken in connection with the accompanying drawing, the advantages of the construction and of the method of operation will be apparent to those skilled in the art to which the invention appertains, and while I have described the principle of operation of the invention, together with the device which I now consider to be the best embodiment thereof, I desire to have it understood that the apparatus shown is merely illustrative, and that such changes may be made when desired, as are within the scope of the claims.

Having thus described the invention, what I claim is:—

1. The combination of a cake pan, with a device for loosening the cake from the pan, said device comprising a central portion adapted to bear on the bottom of the pan, a blade extending from the said portion, and a stationary blade secured to the pan and disposed over said central portion of the device.

2. A cake pan provided with a central tube, in combination with a cake removing device, said device comprising a disk having an opening fitted over the tube, a blade attached to the disk and extending outwardly therefrom in contact with the surface of the pan uncovered by the disk, and a stationary blade on the said tube and disposed over the disk for scraping the same.

3. A cake pan provided with a central tube, in combination with a cake removing device, said device comprising a disk having an opening for fitting over the tube, a blade attached to the disk and extending therefrom to the rim of the pan, a stationary blade on the said tube and engaging the said disk, and a blade carried by the disk and engaging the said tube.

4. A cake pan provided with a central tube; in combination with a cake removing device comprising a single piece of sheet metal formed into a central apertured disk applied to the tube and rotatable about the same, a radial double-edged blade on the disk provided with an upward extension, a grip on the said extension, and an inverted V-shaped blade rising from the disk at the edge of the opening thereof and bearing on the tube of the pan; and a stationary L-shaped member secured to the said tube and formed into a horizontal blade bearing on the said disk and extending from the opening of the latter to the periphery.

In testimony whereof I affix my signature in presence of two witnesses.

FREDRICA O. MICHELSON.

Witnesses:
SAMUEL BRENTON GROVES,
GIDEON C. MICHELSON.